(12) United States Patent
Ito et al.

(10) Patent No.: US 9,044,858 B2
(45) Date of Patent: Jun. 2, 2015

(54) TARGET OBJECT GRIPPING APPARATUS, METHOD FOR CONTROLLING THE SAME AND STORAGE MEDIUM

(75) Inventors: Yoshinori Ito, Tokyo (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/523,234

(22) Filed: Jun. 14, 2012

(65) Prior Publication Data

US 2013/0006423 A1 Jan. 3, 2013

(30) Foreign Application Priority Data

Jun. 28, 2011 (JP) .................................. 2011-143389

(51) Int. Cl.
*G05B 15/00* (2006.01)
*B25J 9/16* (2006.01)
*G05B 19/00* (2006.01)

(52) U.S. Cl.
CPC ..... *B25J 9/1612* (2013.01); *G05B 2219/39476* (2013.01); *G05B 2219/39527* (2013.01); *G05B 2219/39543* (2013.01); *G05B 2219/40053* (2013.01)

(58) Field of Classification Search
CPC ...... B25J 9/1697; B25J 19/023; B25J 9/1692; G05D 1/0246; G05B 2219/37572
USPC ..................................................... 700/1, 259
See application file for complete search history.

(56) References Cited

U.S. PATENT DOCUMENTS

| | | | |
|---|---|---|---|
| 6,721,444 B1 | 4/2004 | Gu et al. | |
| 7,966,094 B2 | 6/2011 | Ban et al. | |
| 8,755,562 B2 * | 6/2014 | Ishigami et al. | 382/103 |
| 2010/0256818 A1* | 10/2010 | Aoba et al. | 700/275 |
| 2012/0059517 A1* | 3/2012 | Nomura | 700/259 |
| 2013/0151007 A1* | 6/2013 | Valpola et al. | 700/245 |
| 2013/0166061 A1* | 6/2013 | Yamamoto | 700/214 |
| 2013/0238124 A1* | 9/2013 | Suzuki et al. | 700/250 |
| 2014/0067126 A1* | 3/2014 | Watanabe et al. | 700/259 |

FOREIGN PATENT DOCUMENTS

| | | | |
|---|---|---|---|
| JP | 63-163975 | A | 7/1988 |
| JP | 03-202290 | A | 9/1991 |
| JP | 04-260536 | A | 9/1992 |
| JP | 08-118273 | A | 5/1996 |
| JP | 2000-263481 | A | 9/2000 |
| JP | 3225740 | B2 | 11/2001 |
| JP | 2007-245283 | A | 9/2007 |
| JP | 4226623 | B2 | 2/2009 |
| JP | 2009-069998 | A | 4/2009 |
| JP | 2009-128192 | A | 6/2009 |
| JP | 2011-083882 | A | 4/2011 |
| JP | 2013-529554 | A | 7/2013 |
| WO | 00/57129 | A1 | 9/2000 |

* cited by examiner

*Primary Examiner* — Ian Jen

(74) *Attorney, Agent, or Firm* — Fitzpatrick, Cella, Harper & Scinto

(57) ABSTRACT

A target object gripping apparatus comprises: an estimation unit configured to estimate an orientation of a target object based on orientation estimation parameters; a gripping unit configured to grip the target object based on the orientation of the target object estimated by the estimation unit; a detection unit configured to detect a failure of gripping by the gripping unit; and a modifying unit configured to modify the orientation estimation parameters based on the orientation of the target object when the detection unit detects a gripping failure.

20 Claims, 14 Drawing Sheets

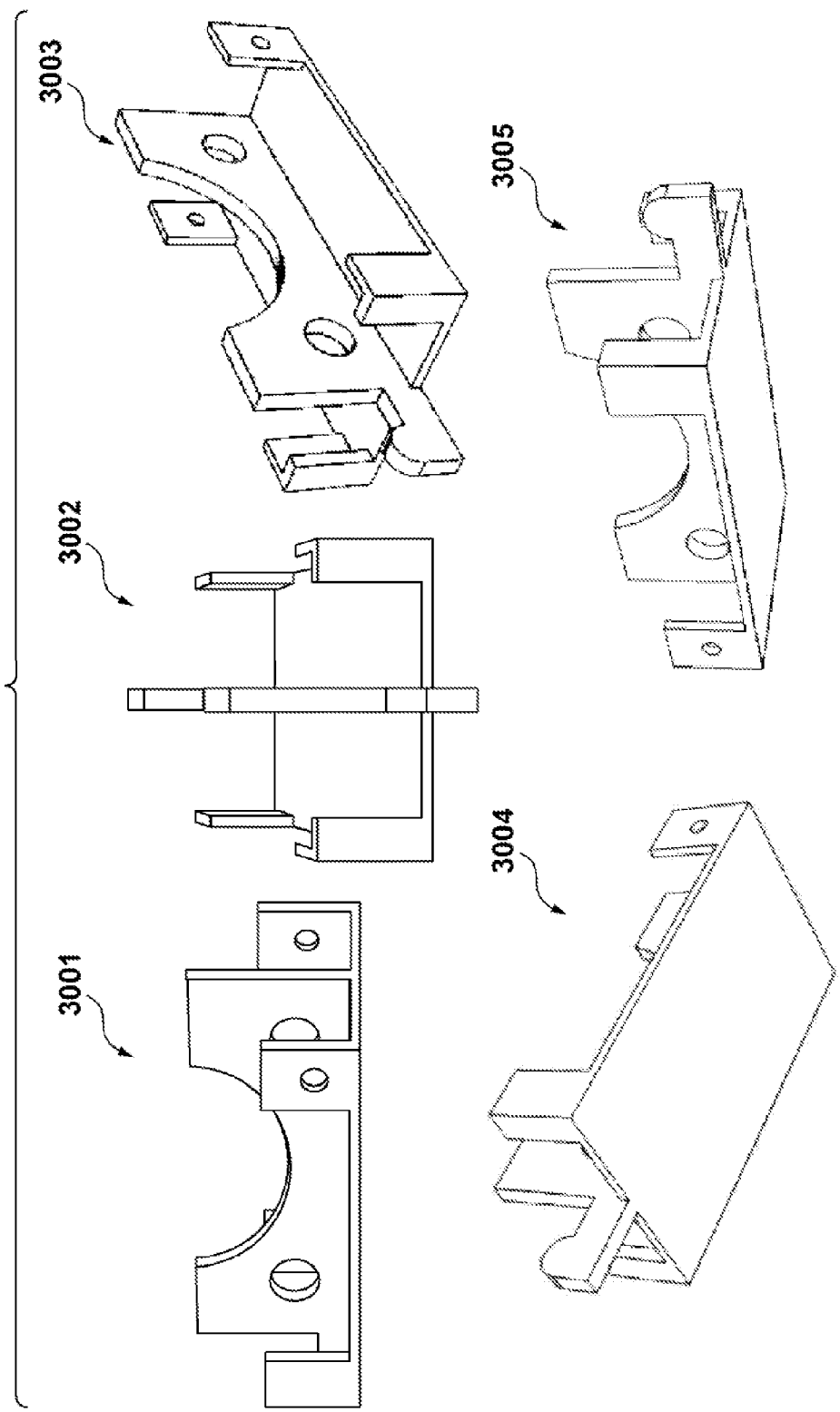

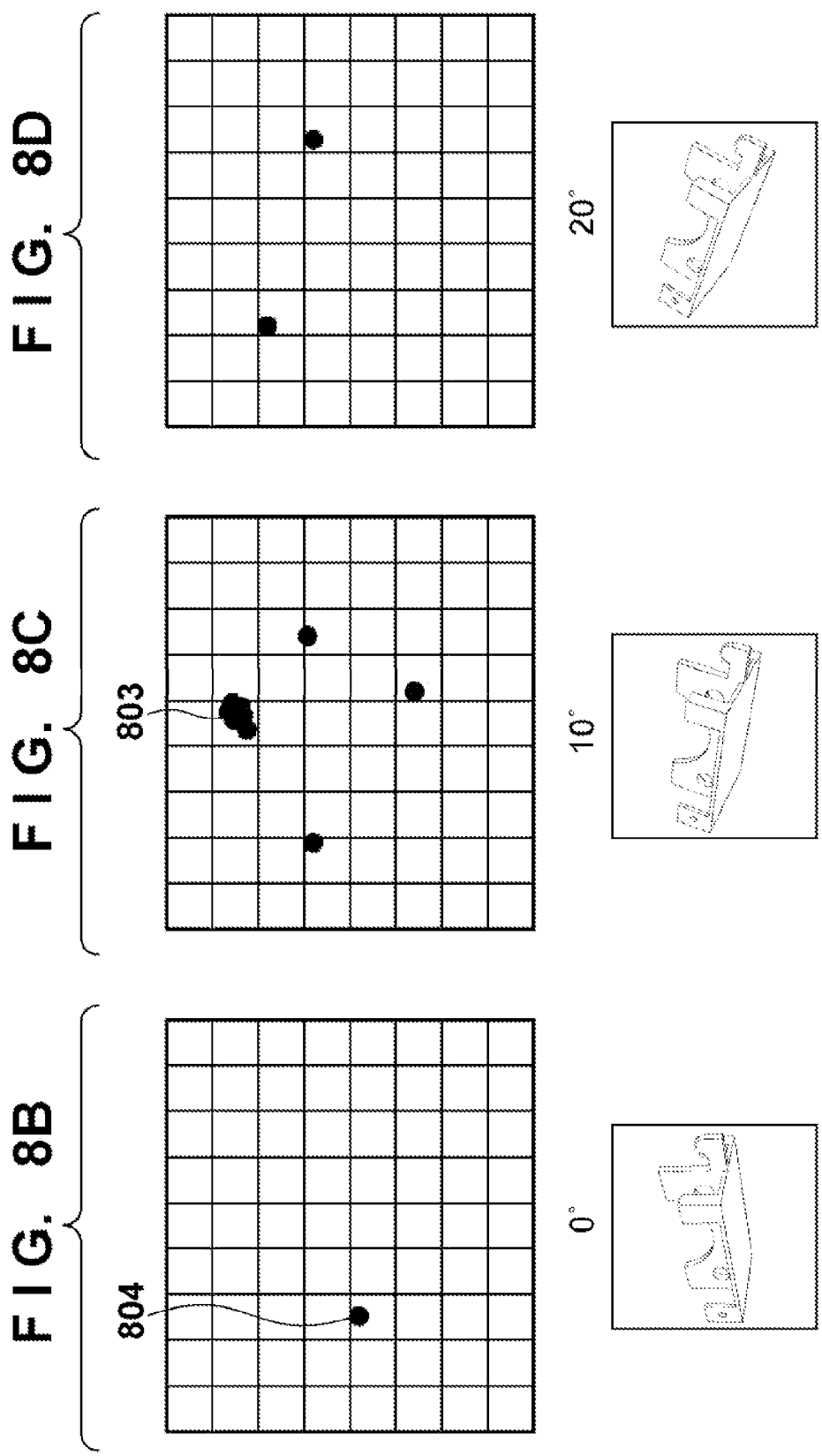

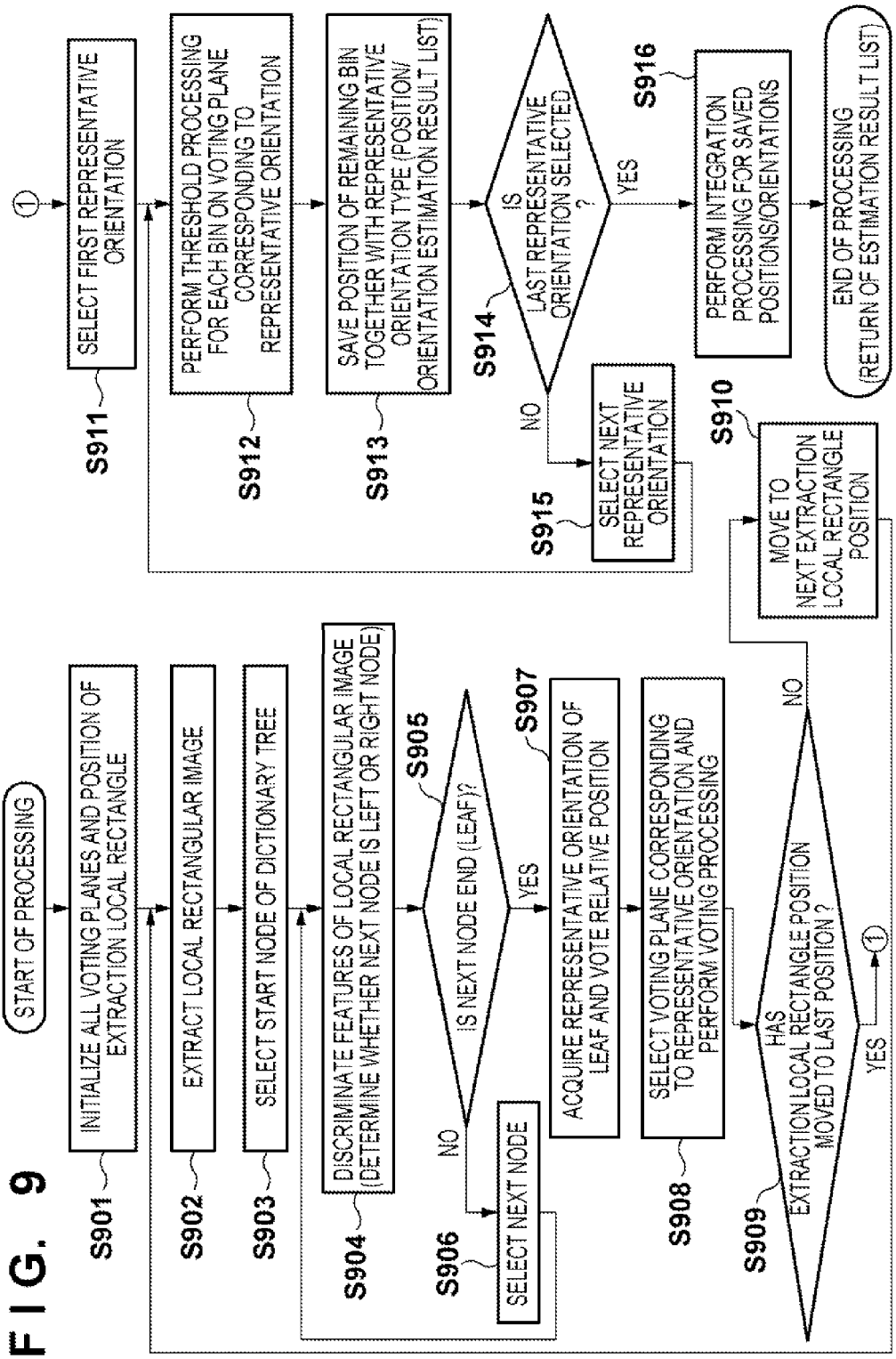

F I G. 12
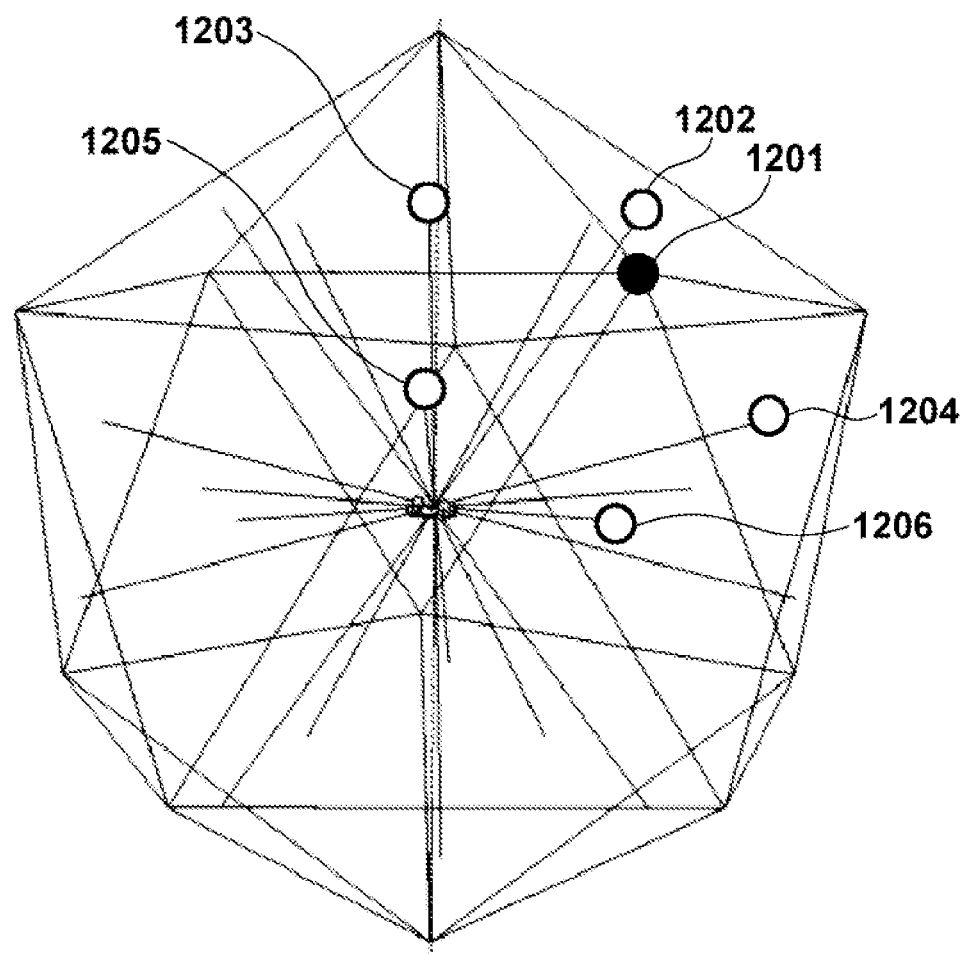

F I G. 14
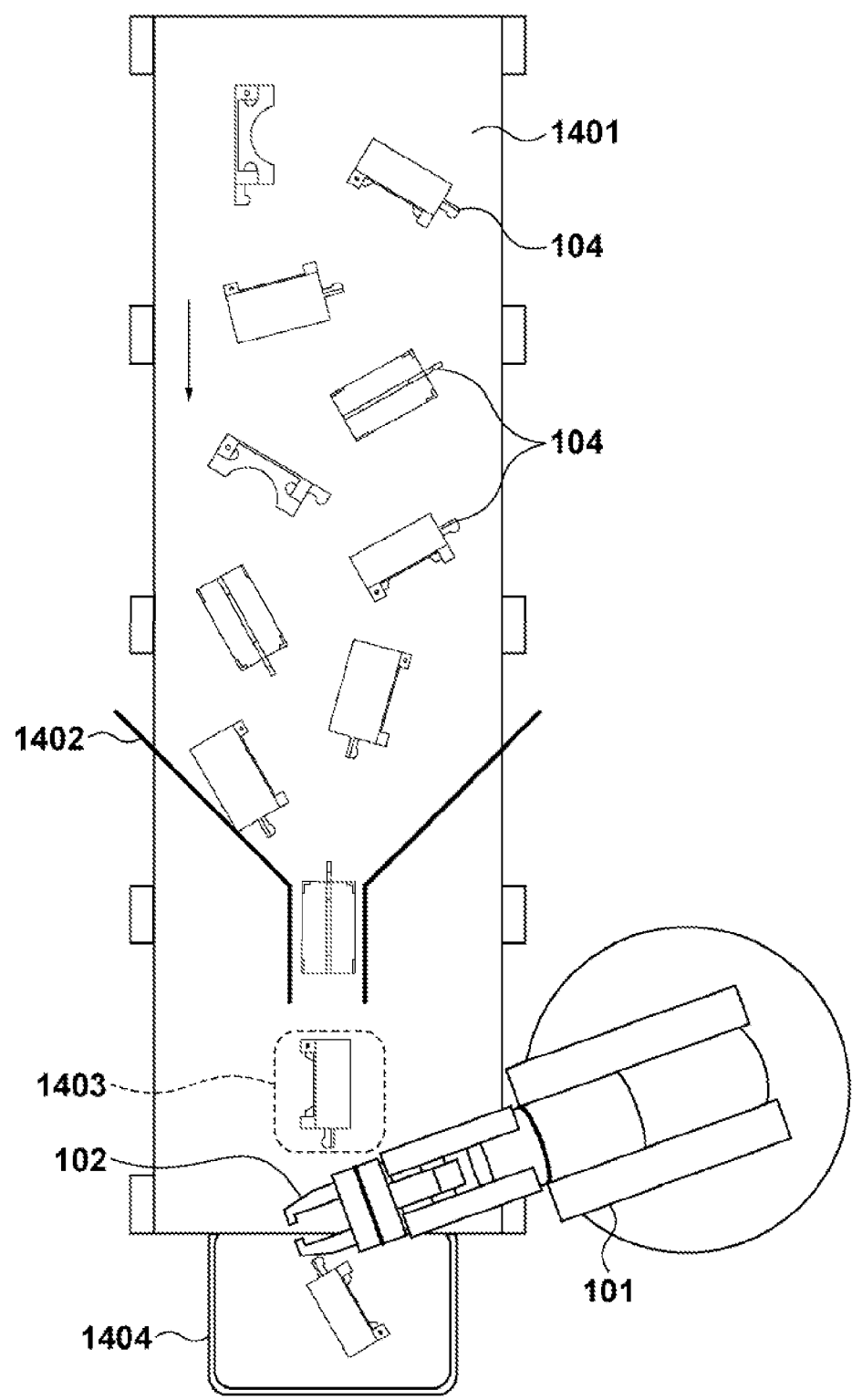

TARGET OBJECT GRIPPING APPARATUS, METHOD FOR CONTROLLING THE SAME AND STORAGE MEDIUM

BACKGROUND OF THE INVENTION

1. Field of the Invention

The present invention relates to a target object gripping apparatus which estimates the orientation of a target object and grips it, a method for controlling the same, and a storage medium.

2. Description of the Related Art

There have been widely developed techniques of imaging the state of a pile of target objects such as parts with a sensor such as a camera, estimating the position or orientation of each target object from acquired information such as an image, and sequentially extracting the target objects by causing a robot to grip them. Japanese Patent Nos. 3225740 and 4226623 disclose techniques of speeding up the processing of gripping target objects.

The technique disclosed in Japanese Patent No. 3225740 is designed to speed up recognition processing by preparing a plurality of matching models for specifying the shape of a target object (part) when a plurality of specific portions of the object assume reference orientations and setting the matching priority order of the models to the descending order of the numbers of times they have been actually recognized at the time of the use of the apparatus.

The technique disclosed in Japanese Patent No. 4226623 is designed to achieve an increase in processing speed and reduce the gripping failure probability for each target object to be selected next by excluding a target object subjected to the failure of the measurement of a three-dimensional position or the failure of extraction from a set of target objects (works) whose coarse positions have been recognized.

In addition, the technique disclosed in Japanese Patent Laid-Open No. 2000-263481 is designed to detect abnormal operations such as a gripping failure based on a change in weight on a 6-axis dynamic sensation sensor and perform subsequent recovery.

In order to sequentially extract target objects from a set of piled target objects, it is necessary to estimate the position and orientation of each target object. It is required from the viewpoint of work efficiency to shorten the time required for position/orientation estimation.

In general, a specific portion of a target object such as part is determined as a portion to be gripped by a manipulator (hand) mounted on the distal end of a robot arm. Depending on the orientation of a target object, therefore, the hand cannot access a specific portion to fail in gripping it. In addition, depending on the orientation of a target object, the information obtained by the sensor may be similar to that of another orientation, and hence erroneous orientation estimation may tend to be performed.

The technique disclosed in Japanese Patent No. 3225740 is designed to achieve an increase in processing speed in consideration of the numbers of times a plurality of specific portions have assumed reference orientations. This technique however gives no consideration to the recognition of erroneous orientations and gripping failures.

The technique disclosed in Japanese Patent No. 4226623 is designed to achieve an increase in processing speed in consideration of coarse positions in case of failure in measuring precise three-dimensional positions and failure in extracting target objects. This technique however gives no consideration to the orientation of a target object having undergone a failure.

The technique disclosed in Japanese Patent Laid-Open No. 2000-263481 is designed to detect abnormality in gripping operation and perform subsequent recovery without calling an operator. That is, this technique is not aimed at speeding up the processing.

That is, conventional techniques have the problem that they give no consideration to the orientation of a target object at the time of failure in gripping the target object.

SUMMARY OF THE INVENTION

In consideration of the above problem, the present invention provides a technique of speeding up the processing of estimating the orientation of a target object and gripping it while reducing the gripping failure probability of gripping operation for target objects.

According to one aspect of the present invention, there is provided a target object gripping apparatus comprising: an estimation unit configured to estimate an orientation of a target object based on orientation estimation parameters; a gripping unit configured to grip the target object based on the orientation of the target object estimated by the estimation unit; a detection unit configured to detect a failure of gripping by the gripping unit; and a modifying unit configured to modify the orientation estimation parameters based on the orientation of the target object when the detection unit detects a gripping failure.

According to one aspect of the present invention, there is provided a method for controlling a target object gripping apparatus, the method comprising the steps of: estimating an orientation of a target object based on orientation estimation parameters; gripping the target object based on the orientation of the target object estimated in the estimating step; detecting a gripping failure in the gripping step; and modifying the orientation estimation parameters based on the orientation of the target object when a gripping failure is detected in the detecting step.

Further features of the present invention will be apparent from the following description of exemplary embodiments with reference to the attached drawings.

BRIEF DESCRIPTION OF THE DRAWINGS

FIG. 3 is a view showing examples of representative orientations of a target object;

FIGS. 8A to 8D are views for explaining the scanning of an extraction local rectangular area and voting processing in tree type orientation estimation processing;

FIG. 9 is a flowchart showing a procedure for tree type orientation estimation processing;

FIG. 12 is a view for explaining peripheral orientations around a failure orientation;

FIG. 14 is a view showing an example of a target object gripping apparatus when the orientations of target objects vary but their positions remain almost constant.

DESCRIPTION OF THE EMBODIMENTS

Figure 1:
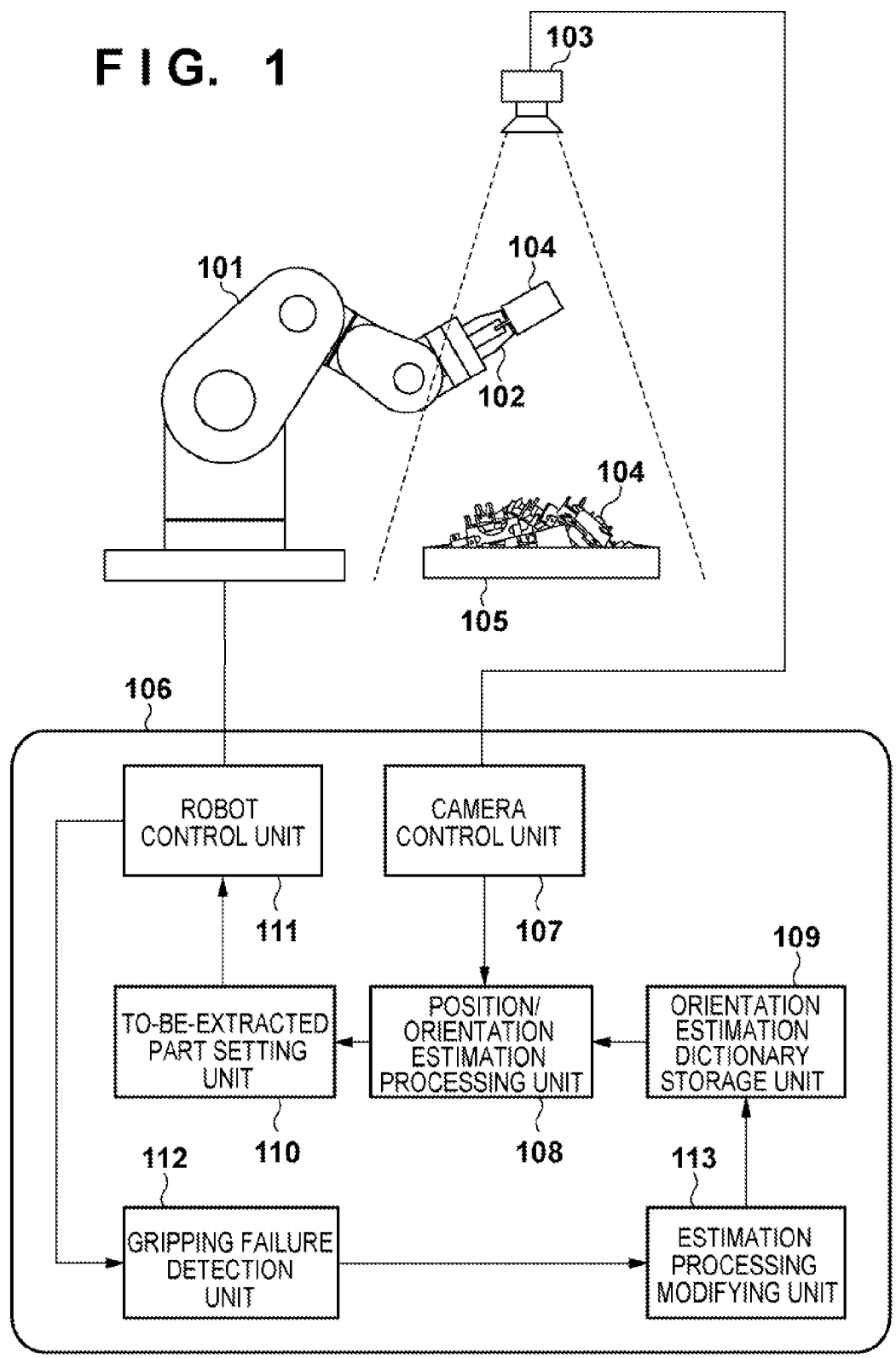
FIG. 1 is a view showing the arrangement of a target object gripping apparatus.

An exemplary embodiment(s) of the present invention will now be described in detail with reference to the drawings. It should be noted that the relative arrangement of the parts, the numerical expressions and numerical values set forth in these embodiments do not limit the scope of the present invention unless it is specifically stated otherwise.

First Embodiment

The arrangement of a target object gripping apparatus according to the first embodiment will be described with reference to FIG. 1. The target object gripping apparatus includes a robot arm 101, a hand mechanism 102, an imaging device 103, and a controller 106.

The hand mechanism 102 functions as an end effector of the robot arm 101. The imaging device 103 is a sensor which acquires the state of parts 104 on a tray 105, and acquires an image of the tray 105 on which parts are piled. The imaging device 103 may be a monocular camera for obtaining two-dimensional luminance image information or a distance measuring sensor for obtaining distance information, such as a stereo camera, TOF sensor, or laser range finder. The present invention is not limited to any specific one of them. The part 104 is an example of a part as a target object to be gripped. The tray 105 is a tray on which a plurality of parts 104 are piled.

The controller 106 controls the robot arm 101, the hand mechanism 102, and the imaging device 103. The controller 106 includes a camera control unit 107, a position/orientation estimation processing unit 108, an orientation estimation dictionary storage unit 109, a to-be-extracted part setting unit 110, a robot control unit 111, a gripping failure detection unit 112, and an estimation processing modifying unit 113.

The camera control unit 107 acquires the image information of the tray 105 imaged by the imaging device 103 while controlling the imaging device 103. The position/orientation estimation processing unit 108 estimates the positions and orientations of the parts 104 included in the image by performing analysis processing for the image information acquired by the camera control unit 107 by using the dictionary data stored in the orientation estimation dictionary storage unit 109. The orientation estimation dictionary storage unit 109 stores parameters such as dictionary data for the estimation of the positions and orientations of the parts 104. These orientation estimation parameters may include an orientation-specific matching priority order and weighting coefficients.

The to-be-extracted part setting unit 110 sequentially selects parts to be gripped from many parts whose positions and orientations have been estimated, and notifies the robot control unit 111 of the information of the gripped portion of each part to be gripped by the hand mechanism 102. As a method for selecting a part to be gripped, it is conceivable to use, for example, a method for selecting a part which is located at the uppermost position, has a gripped portion exposed, and allows easy control for gripping, or a method for selecting a part which exhibits high reliability of estimation by the position/orientation estimation processing unit 108.

The robot control unit 111 controls and makes the robot arm 101 and the hand mechanism 102 operate by generating instructions to grip the part 104 and perform postprocessing based on the information of the gripped portion of the part 104 selected by the to-be-extracted part setting unit 110.

The gripping failure detection unit 112 receives an output from an abnormality sensor (not shown) provided on the hand mechanism 102 via the robot control unit 111. The gripping failure detection unit 112 then analyzes the output from the sensor to discriminate whether the part 104 has been successfully gripped. As this abnormality sensor, for example, a dynamic sensation sensor (not shown) provided on the hand mechanism 102 may be used. For example, it is possible to detect a gripping failure by using the technique disclosed in Japanese Patent Laid-Open No. 2000-263481. Note that this apparatus may be configured to detect a gripping failure by analyzing the image captured by the imaging device 103. For example, the apparatus may detect a gripping failure by recognizing that the part 104 is spaced apart from the grip portion.

Upon detection of a gripping failure by the gripping failure detection unit 112, the estimation processing modifying unit 113 modifies the orientation estimation parameters held in the orientation estimation dictionary storage unit 109 based on the orientation of the target object (part 104) at this time.

In this case, the position/orientation estimation processing unit 108 described above is a classifying device which detects the positions of target objects and classifies their orientations into classes. An orientation corresponding to each class is called a representative orientation and defined by a combination of a geodetic dome and an in-plane rotation. In this case, a geodetic dome is a known technique of uniformly and discretely expressing a spherical surface by using the respective vertices of a regular polyhedron or the center points of the surface elements or the vertices of triangles obtained by recursively dividing each triangular surface element into triangles with the same area.

Figure 2:
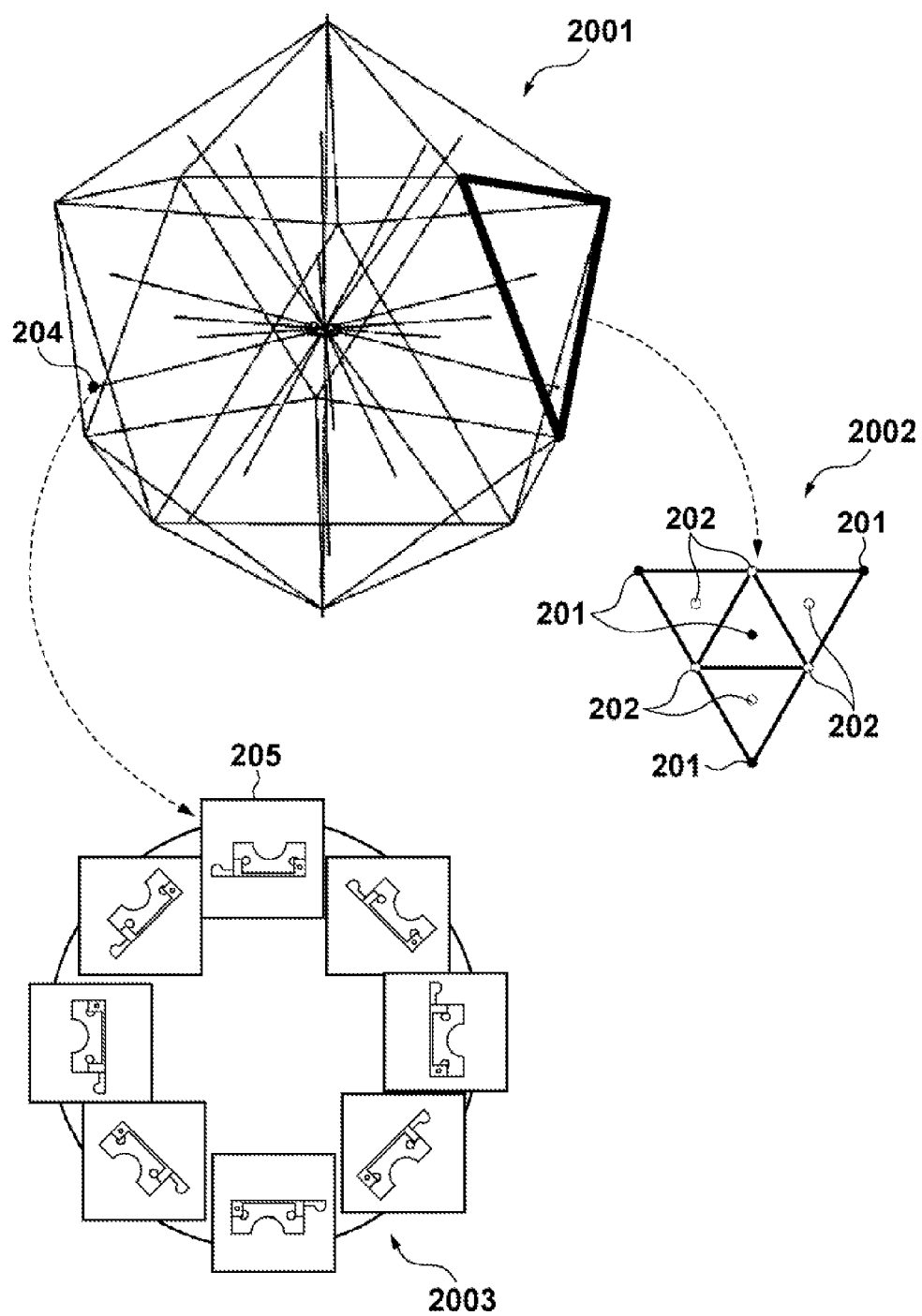
FIG. 2 is a view for explaining an approach to a geodetic dome.

Reference numeral 2001 in FIG. 2 denotes an example of a geodetic dome based on a regular icosahedron. Assume that a target object in a predetermined orientation is placed to make its barycentric point coincide with the center point of a regular icosahedron. In this case, for example, the ways how the target object looks when it is observed with the respective vertices and the center points of the respective triangular surface elements being viewpoints are defined as representative orientations. Lines of sight from the respective viewpoints intersect at the center point of the target object, that is, the barycentric point of the regular icosahedron. The regular icosahedron has 16 vertices and 20 surface elements, and hence a geodetic dome using the regular icosahedron without any change allows to define representative orientations from a total of 36 viewpoints.

In general, however, such granularity is not sufficient accuracy for gripping. For this reason, in this embodiment, each side of each surface element is further divided into two parts. As a consequence, each regular triangular surface element of the regular icosahedron is constituted by four small regular triangles with the same area as denoted by reference numeral 2002 in FIG. 2. In this case, viewpoints 201 represent a total of four viewpoints defined by the vertices of the original regular icosahedron and the center point of the surface element, and viewpoints 202 represent a total of six viewpoints additionally obtained by dividing the regular triangle into small triangles. The number of surface center points becomes four times that of the original triangular surface elements (20 surfaces). The number of vertices increases by the number (=34) of sides of the original regular icosahedron. That is, with this division, it is possible to define representative orientations from 16+34+20×4=130 viewpoints.

Reference numeral 2003 in FIG. 2 denotes an example of in-plane rotation. An image 205 is an image of a part acquired from a viewpoint 204 in the regular icosahedron 2001 in FIG. 2. Rotating this image through a predetermined angle at a time can obtain a plurality of representative orientations like those shown in FIG. 2. Assume that in this embodiment, these orientations are defined by performing in-plane rotation through 10° at a time. That is, since there are 36 in-plane rotation patterns with respect to each of the above 130 viewpoints, 130×36=4680 representative orientations are defined.

In this case, since a viewpoint corresponds to the observation position of the imaging device 103, representative orientations correspond to image variations of each target object captured by the imaging device 103. The orientation estimation dictionary storage unit 109 holds matching data generated from the image data of all representative orientations, imaged in advance while the orientation of each part is changed, by a technique like machine learning. Reference numerals 3001 to 3005 in FIG. 3 denote five examples of the image data of the respective representative orientations.

In this embodiment, the position/orientation estimation processing unit 108 performs estimation processing for the position of each target object in a camera coordinate system which is a coordinate system with reference to the imaging device 103 and classification processing for the representative orientations of the target object by template matching processing.

The orientation estimation dictionary storage unit 109 therefore holds all the matching data (templates) corresponding to 4,680 representative orientation classes. However, the apparatus may be configured to hold only 130 templates from the respective viewpoints with 0° rotation and generate templates corresponding to in-plane rotations by rotation processing for each matching operation, thereby reducing the amount of data held.

In this case, the position of a reference point (object center or the like) of a target object in the camera coordinate system is represented by a translation vector $P_W$ from the origin of the camera coordinate system. This position corresponds to the position of the target object to be estimated. The position of a part in the depth direction viewed from the camera coordinate system may be estimated based on the size of the detected part in the image or may be estimated more accurately by using a distance measuring sensor like a range finder.

The apparatus then estimates the orientation of the detected target object based on matching with the template of a specific one of the representative orientation classes. In this case, the orientation of the target object can be represented by orientation matrix $E_W=[e_{WX}, e_{WY}, e_{WZ}]$ based on a combination of vectors in three axial directions in the part coordinate system in the camera coordinate system. In this case, $e_{WX}$, $e_{WY}$, and $e_{WZ}$ represent unit column vectors, each having a length of 1, respectively fixed in the three directions relative to the reference position of the part so as be perpendicular to each other. That is, the unique orientation matrix $E_W$ is made to correspond to each representative orientation.

In addition, a gripping position (gripped portion) on a part to be gripped by the hand mechanism 102 is generally set to a specific portion. A state in which this gripped portion is properly gripped is defined in advance by a similar target object position $P_h$ and orientation matrix $E_h$ in the hand coordinate system with reference to the hand mechanism 102. The robot control unit 111 therefore performs gripping operation planning and control for the respective joints of the robot arm 101 and the hand mechanism 102 so as to match the position $P_W$ and the orientation $E_W$ in the camera coordinate system of a part to be gripped with the position $P_h$ and the orientation $E_h$ in the hand coordinate system.

<Position/Orientation Estimation Processing>

Figure 4A:
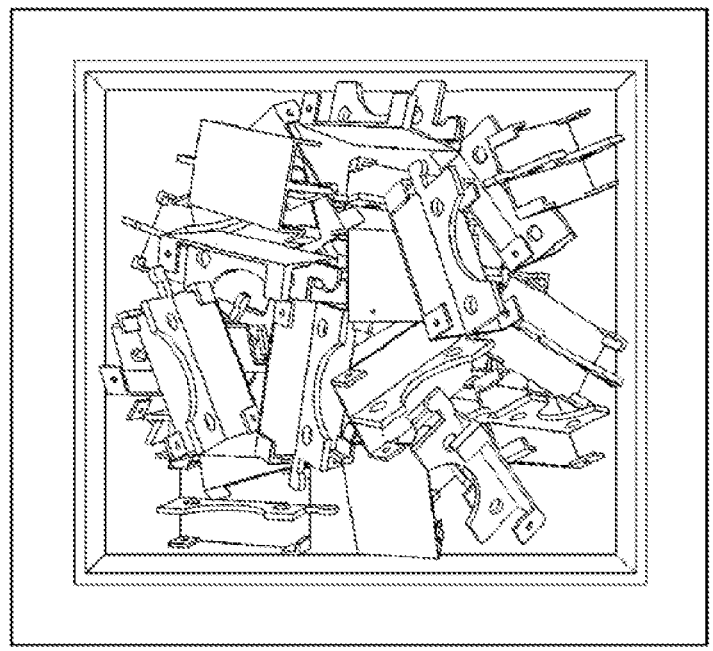
FIG. 4A is a view showing an example of an image of piled target objects imaged by an imaging device.

A position/orientation estimation technique based on template matching processing performed by the position/orientation estimation processing unit 108 will be described below with reference to FIGS. 4A, 4B, and 5. FIG. 4A shows an example of image data captured by the imaging device 103. This image data is obtained by imaging a large number of parts 104 piled on the tray 105.

Figure 4B:
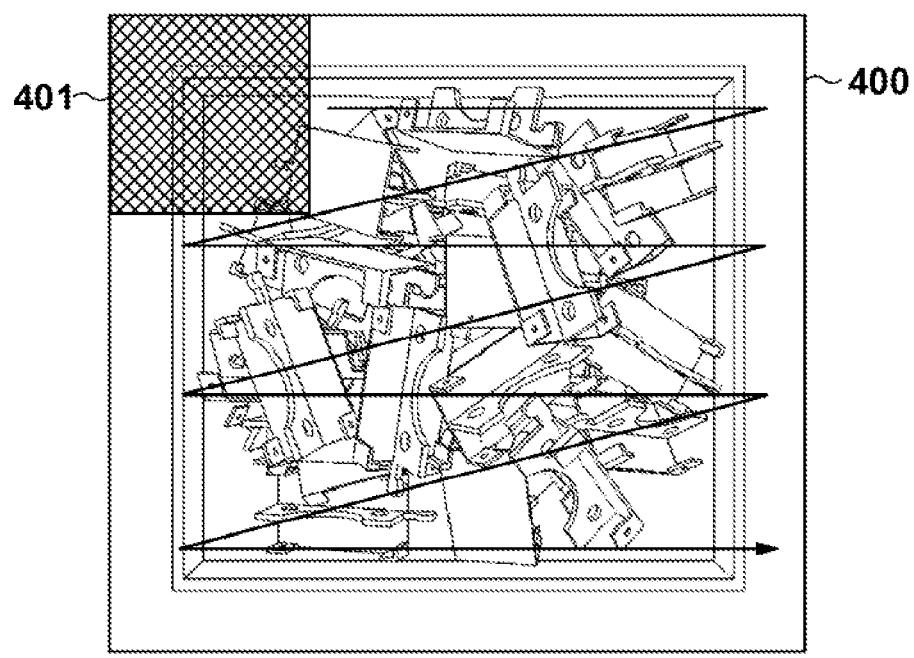
FIG. 4B is a view for explaining window scanning for orientation estimation processing using template matching.

FIG. 4B shows how the position/orientation estimation processing unit 108 performs position/orientation estimation processing based on template matching by scanning the image in FIG. 4A sent via the camera control unit 107. In this case, the apparatus thoroughly scans the entire image area (or the range in which the parts are known to exist) with an extraction window 401 having the same size as that of a template and set on the image data 400 corresponding to the image in FIG. 4A.

The apparatus performs correlation computation between a partial image of the rectangular area extracted by the extraction window 401 and matching data (that is, a template) corresponding to each representative orientation to discriminate whether a part in the representative orientation exists at the corresponding position. A template used in this case is a part image captured by imaging a part in each representative orientation from a predetermined distance (that is, an image having the same size as that of the extraction window 401) or image data generated by performing predetermined preprocessing such as edge extraction for the part image. Note that when using a template having undergone predetermined preprocessing, the apparatus performs the same preprocessing for the entire area of image data 400 in advance before extraction processing.

A procedure for part position/orientation estimation processing performed by the position/orientation estimation processing unit 108 according to this embodiment will be described below with reference to the flowchart of FIG. 5.

In step S501, the position/orientation estimation processing unit 108 sets a predetermined position of the extraction window 401 set on the image data 400 as an initial position. In this embodiment, since the entire area of the image data 400 is regarded as an area where parts can exist, the upper left position on the image is set as the initial position of the extraction window 401.

In step S502, the position/orientation estimation processing unit 108 extracts and acquires a partial image of a rectangular area at the current extraction window position from the image data 400.

In step S503, the position/orientation estimation processing unit 108 selects first a template corresponding to an arbitrary representative orientation from templates corresponding to 4,680 representative orientations stored in the orientation estimation dictionary storage unit 109. Although the following will exemplify a case in which 4,680 templates are used, it is possible to use other numbers of templates.

In step S504, the position/orientation estimation processing unit 108 calculates the correlation value between the extracted partial image and the representative orientation template selected in step S503 (correlation value calculation processing).

In step S505, the position/orientation estimation processing unit 108 discriminates whether the correlation value calculated in step S504 is equal to or more than a predetermined value. If the position/orientation estimation processing unit 108 determines that the correlation value is equal to or more than the predetermined value (YES in step S505), the process advances to step S506. If the position/orientation estimation processing unit 108 determines that the correlation value is smaller than the predetermined value (NO in step S505), the process advances to step S507.

In step S506, the position/orientation estimation processing unit 108 estimates the existence of a part in the selected representative orientation at the current extraction window position, and stores the position and the representative orientation in a position/orientation estimation result list. The process then advances to step S507.

In step S507, the position/orientation estimation processing unit 108 determines whether matching processing using templates corresponding to all the representative orientations is complete. If the position/orientation estimation processing unit 108 determines that all the matching processing is complete (YES in step S507), the process advances to step S509. If the position/orientation estimation processing unit 108 determines that all the matching processing is not complete (NO in step S507), the process advances to step S508.

In step S508, the position/orientation estimation processing unit 108 selects a template corresponding to the next arbitrary representative orientation from the templates corresponding to the 4,680 representative orientations stored in the orientation estimation dictionary storage unit 109. The process then returns to step S504.

In step S509, the position/orientation estimation processing unit 108 determines whether the extraction window 401 has scanned up to the last position. If the position/orientation estimation processing unit 108 determines that the extraction window 401 has moved to the last position (YES in step S509), the process advances to step S511. If the position/orientation estimation processing unit 108 determines that the extraction window 401 has not moved to the last position (NO in step S509), the process advances to step S510.

In step S510, since processing for all the orientation-specific templates is complete, the position/orientation estimation processing unit 108 moves the extraction window 401 to the next position. The process then returns to step S502.

Note that the scanning rule used in this case is that, as shown in FIG. 4B, the extraction window 401 is shifted to the right pixel by pixel and moved to the left end of a row located one pixel below the previous one when reaching the right end of the image data 400, and the same operation is repeated up to the lower right end of the image data 400. Obviously, in order to speed up the processing, it is possible to move the window by several pixels at a time instead of one pixel. In this case, the position detection accuracy is on the order of several pixels.

Although not mentioned in the above description for the sake of easy understanding, in practice, the apparatus also detects the representative orientations of parts with slightly different sizes by changing the magnification of an image or template within a predetermined range. The apparatus then estimates not only the positions of the detected part in two-dimensional directions, that is, vertical and horizontal directions, but also the position of the part in the depth direction viewed from the camera. Obviously, the apparatus may detect the position in the depth direction more accurately by using a distance measuring sensor.

In step S511, the position/orientation estimation processing unit 108 integrates a plurality of position/orientation data stored in the position/orientation estimation result list. In general, in such position/orientation estimation processing, the correlation values of neighboring positions and similar orientations tend to be high as well as those of the position where the part exists and its orientation, and hence it is necessary to perform integration processing. In the present invention, the integration processing technique to be used is not specifically limited. For example, it is possible to use a known technique of integrating values in areas and orientation ranges exhibiting high correlation values and calculating the averages of the values. Obviously, priorities may be assigned to orientations exhibiting high correlation values.

Figure 5:
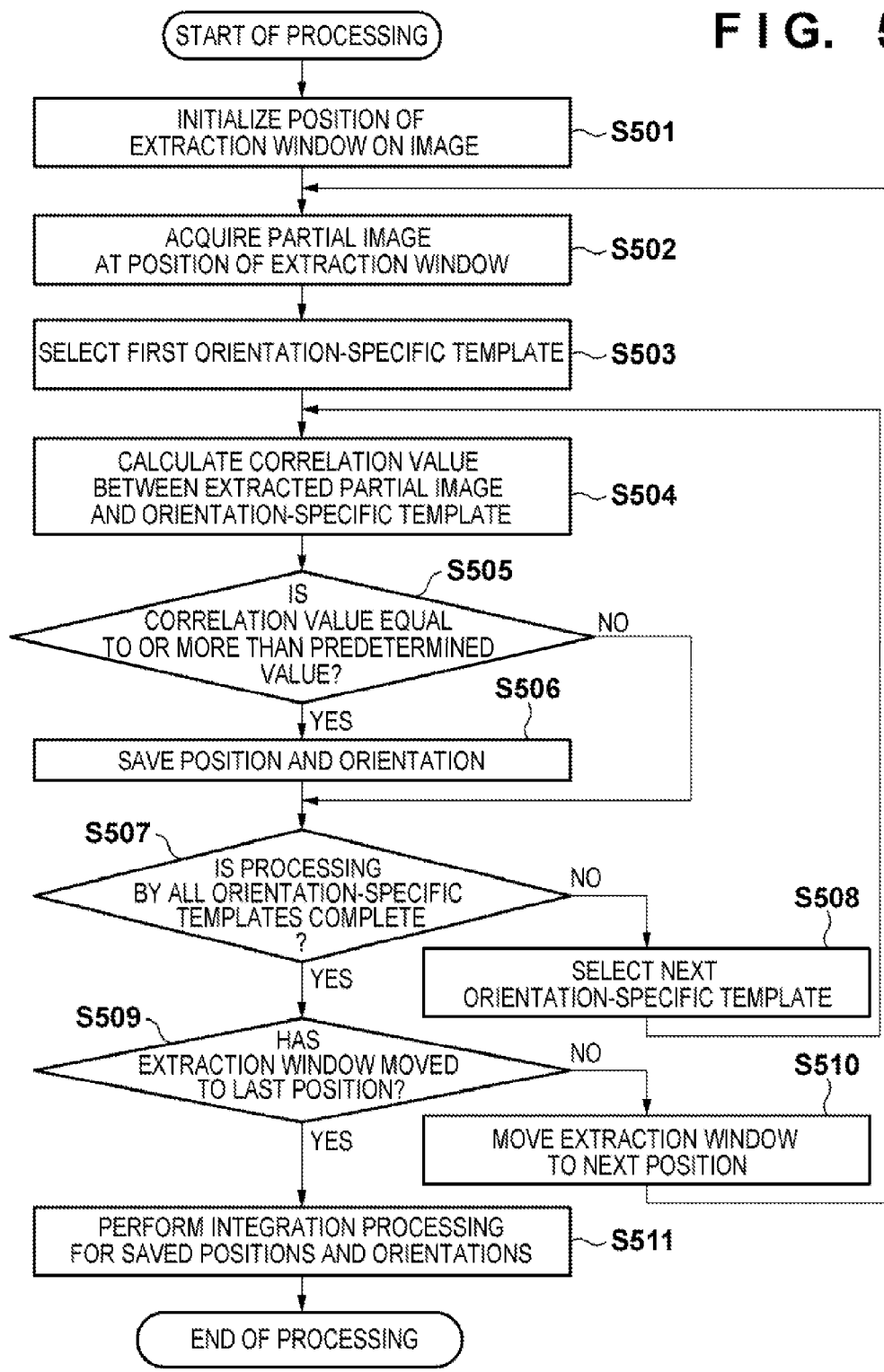
FIG. 5 is a flowchart showing a procedure for orientation estimation processing using template matching.

With the above operation, the processing in the flowchart of FIG. 5 is complete, and the positions and orientations of a plurality of parts included n the image data 400 are estimated.

<Gripping Processing with Dictionary Updating>

A procedure for gripping processing according to this embodiment will be described next with reference to the flowchart of FIG. 6. Gripping failures occur due to a complex combination of various factors such as the piled state of parts and error factors in the respective elements in the hand mechanism, gripping operation planning/control system, and position/orientation estimation processing. This embodiment modifies estimation processing performed by the position/orientation estimation processing unit 108 by modifying matching data stored in the orientation estimation dictionary storage unit 109 based on the occurrence of gripping failures without discriminating these factors. This will speed up the orientation estimation processing by gradually saving estimation of orientations exhibiting high failure probabilities, and will make parts in estimated orientations robust against gripping failure.

In step S601, the camera control unit 107 acquires image data, like the image data 400 shown in FIG. 4B, captured by imaging the many parts 104 in a piled state. The imaging device 103 performs this imaging operation under the control of the camera control unit 107.

In step S602, the position/orientation estimation processing unit 108 performs the processing of estimating the positions and orientations of the parts included in the acquired image data. In this embodiment, this processing is the processing in the flowchart of FIG. 5 as described above. This makes it possible to obtain a list of position/orientation estimation results on a plurality of parts.

In step S603, the position/orientation estimation processing unit 108 determines whether there is a part whose position and orientation could be estimated. If the position/orientation estimation processing unit 108 determines that there is a part whose position and orientation could be estimated (YES in step S603), the process advances to step S604. If the position/orientation estimation processing unit 108 determines that there is no part whose position and orientation could be estimated (NO in step S603), the processing ends. The gripping apparatus then stops until, for example, the next tray is sent.

In step S604, the to-be-extracted part setting unit 110 selects one of the parts whose positions and orientations could be estimated. As described above, the to-be-extracted part setting unit 110 may select, for example, a part located at the uppermost position (near the camera) or a part on which a position/orientation estimation result with high reliability has been obtained.

In step S605, the robot control unit 111 makes a gripping operation plan based on the position/orientation information of the part selected in step S604, and controls the robot arm 101 and the hand mechanism 102, thereby gripping the part.

In step S606, the gripping failure detection unit 112 determines whether the gripping operation has succeeded. If the gripping failure detection unit 112 determines that the gripping operation has succeeded (YES in step S606), the process advances to step S607. If the gripping failure detection unit 112 determines that the gripping operation has failed (NO in step S606), the process advances to step S608.

In step S607, the robot control unit 111 controls the robot arm 101 and the hand mechanism 102 so as to perform predetermined postprocessing (for example, assembly and relocation). When the postprocessing is complete, the process returns to step S603 to repeat the same processing if there is still a part whose position/orientation could be estimated.

In step S608, the estimation processing modifying unit 113 confirms the estimated orientation of the part subjected to the gripping failure. The estimation processing modifying unit 113 then calculates an orientation-specific gripping failure probability from a past gripping success/failure history associated with the orientation. In this case, as a failure history, the estimation processing modifying unit 113 may use history data obtained from parts in various piled states. Alternatively, the estimation processing modifying unit 113 may calculate a gripping failure probability associated with the estimated orientation of the part in accordance with the positions and orientations of neighboring parts.

In step S609, the estimation processing modifying unit 113 determines whether the calculated orientation-specific gripping failure probability exceeds a predetermined reference value. If the estimation processing modifying unit 113 determines whether the orientation-specific gripping failure probability exceeds the predetermined reference value (YES in step S609), the process advances to step S610. In contrast, if the estimation processing modifying unit 113 determines that the orientation-specific gripping failure probability is equal to or less than the predetermined reference value (NO in step S609), the process returns to step S601.

In step S610, the estimation processing modifying unit 113 determines that the orientation tends to lead to a gripping failure, and deletes (or invalidates) matching data corresponding to the orientation stored in the orientation estimation dictionary storage unit 109. Thereafter, since it is thought that the piled state of the tray 105 has changed due to the touch by the hand mechanism 102, the process returns to step S601 to redo the processing from imaging operation.

Since matching data in the position/orientation estimating processing in step S602 gradually decreases online based on failure probabilities, the processing is gradually speeded up. In addition, the apparatus gradually stops to detect parts in orientations which tend to lead to gripping failures, failures themselves do not easily occur, thus speeding up the overall gripping processing.

There are conceivable several factors that tend to lead to gripping failures. For example, although a part allows proper orientation estimation, the orientation itself makes it difficult to access the gripped portion. Such a case can occur when, for example, the gripped portion faces down or the part tends to be buried among other parts. Alternatively, the orientation tends to lead to an orientation estimation error. In any case, the present invention can cope with such cases without discriminating factors.

According to this embodiment, it is possible to speed up the processing of estimating the orientations of target objects and gripping them while reducing the failure probability of gripping operation for the target objects.

Second Embodiment

Explanation of Tree Type Position/Orientation Estimation Device

The present invention can be applied to a position/orientation estimation processing scheme different from that in the first embodiment. This embodiment will exemplify a case in which a tree type position/orientation estimation processing is used.

Note that a target object gripping apparatus according to this embodiment has the same arrangement as that shown in FIG. 1. A position/orientation estimation processing unit 108 performs position/orientation estimation processing. As in the above description, an estimation dictionary storage unit 109 holds dictionary information to be used in this case. In addition, a basic procedure for gripping processing is the same as that shown in the flowchart of FIG. 6. Therefore, only the differences between the procedures will be described. Furthermore, there are 4,680 representative orientations as in the first embodiment.

Figure 7A:
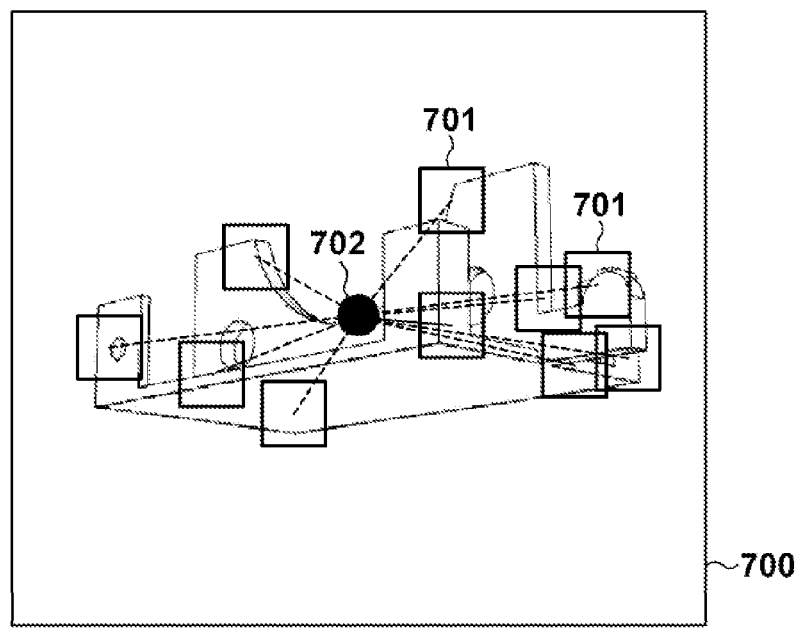
FIGS. 7A and 7B are views for explaining the processing structure of tree type orientation estimation processing.

An example of the processing structure of tree type position/orientation estimation processing used in this embodiment will be described with reference to FIGS. 7A and 7B. Referring to FIG. 7A, an image 700 is one of representative orientation images for the generation of dictionary information. Local areas 701 are local areas set in portions characteristic to the representative orientation image 700. The local areas 701 are set in 10 portions for each representative orientation. Note that the positions at which the local areas 701 are set differ for the respective representative orientations. Since there are 4,680 representative orientations as described above, there are 46,800 local areas. The positions of the respective local areas 701 relative to a two-dimensional object center 702 in each representative orientation are associated with each other. For the sake of descriptive simplicity, in this embodiment, all the local areas have the same size. In practice, however, they may have different sizes.

Figure 7B:
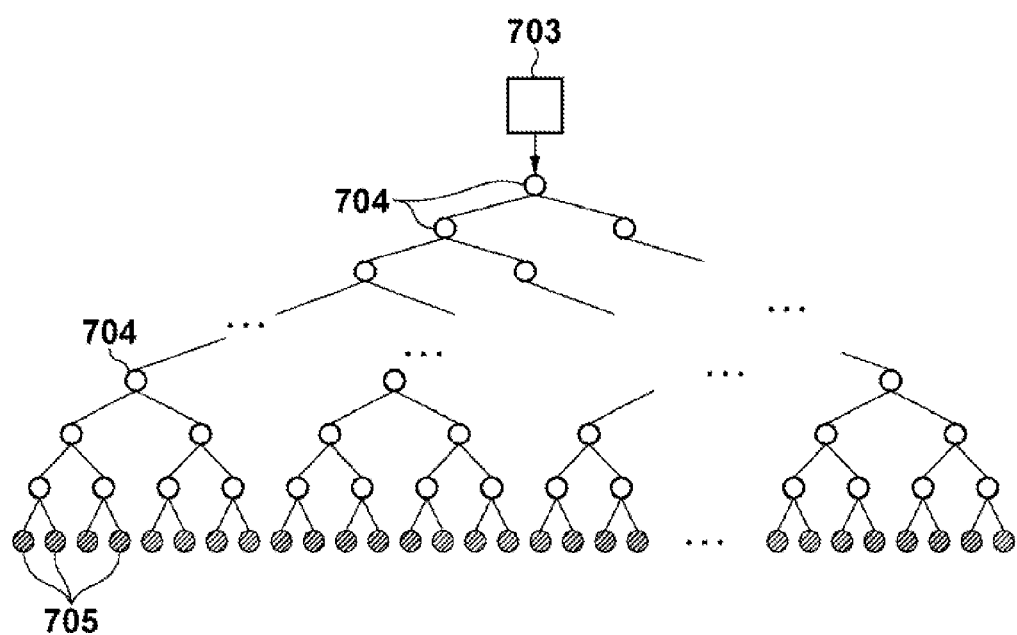

FIG. 7B shows the structure of a tree type classifying device used in tree type position/orientation estimation processing in this embodiment. This tree has a structure formed from a combination of binary trees. At each node 704, the apparatus determines whether an input rectangular image belongs to the right or left group of the binary tree, by performing simple feature discrimination processing such as discriminating the magnitude relationship between predetermined two points in a rectangular image or discriminating whether the total pixel value in a predetermined area is equal to or more than a threshold. The apparatus holds feature discrimination processing parameters as dictionary data corresponding to the respective nodes 704.

There are 46,800 leaves 705 at the last level of the tree. The respective leaves correspond to the 46,800 local area classes described above. Dictionary data corresponding to each leaf 705 holds information indicating to which one of the 4,680 representative orientation types the local area having undergone class discrimination belongs and information indicating the position of the local area relative to the object center 702.

Figure 8A:
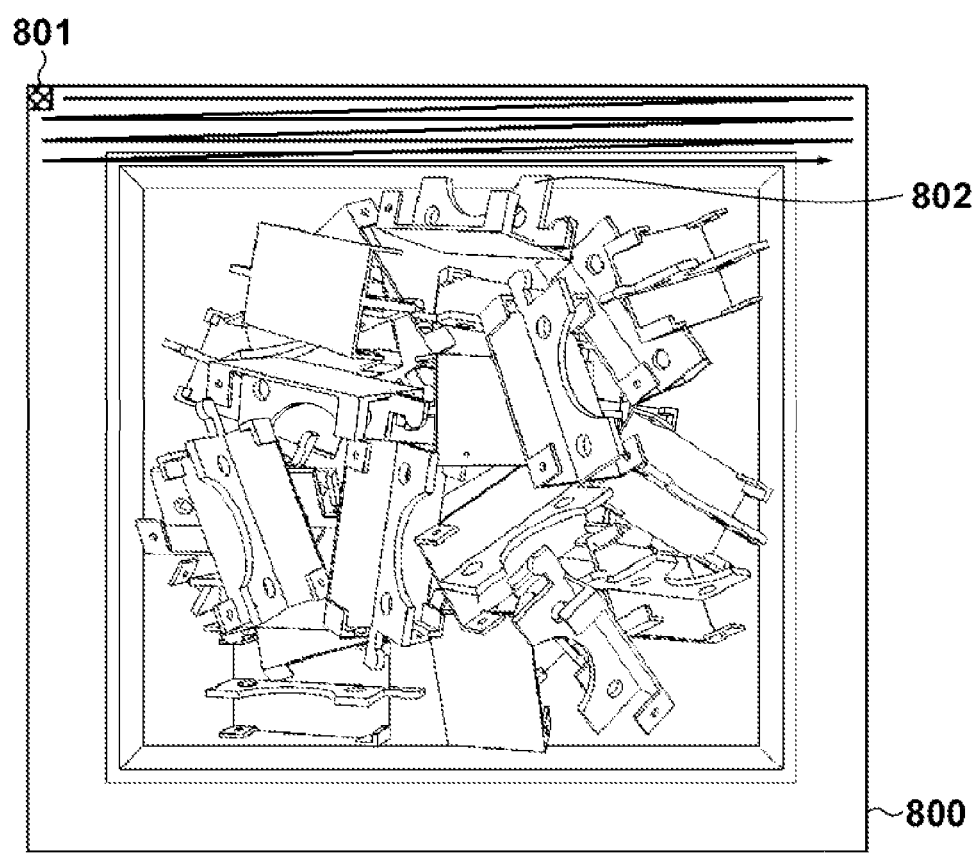

The following description will be made with reference to FIG. 8 on the way of performing scanning an extraction local rectangle in tree type position/orientation estimation processing and performing voting processing after classification upon scanning up to the leaves 705. Image data 800 in FIG. 8A indicates the image data acquired by an imaging device 103. An extraction local rectangle 801 is an extraction local rectangle which is set at the initial position on the image data 800 and has the same size as that of local areas. The apparatus scans the entire image area (or the range in which the parts are known exist) with the extraction local rectangle 801 in the same manner as scanning with the extraction window 401 in FIG. 4.

The rectangular image extracted by the extraction local rectangle 801 is input to the tree type classifying device having the structure shown in FIG. 7B, and is made to finally reach the leaf 705, thereby performing classification to discriminate to which one of the 46,800 local areas the image is most similar.

In this case, different voting planes are respectively prepared for the 4,680 representative orientations. A voting plane is a two-dimensional histogram obtained by dividing the entire area of a captured image under processing into grids with granularity with which the position of a target object is to be specified and assigning one bin to each grid.

The position/orientation estimation processing unit 108 refers to dictionary information corresponding to the leaf 705 to which the extracted local rectangle 801 is classified, and selects a voting plane corresponding to a representative orientation to which the classified local area belongs. A vote is cast for the bin corresponding to the position of the object center 702 of the voting plane.

FIGS. 8B, 8C, and 8D each show an example of a voting plane. FIG. 8B shows a voting plane for a representative orientation corresponding to the image data 3005 in FIG. 3. FIG. 8C shows a voting plane corresponding to a representative orientation whose sight is rotated clockwise through 10° from the same viewpoint. FIG. 8D shows a voting plane corresponding to a representative orientation whose sight is rotated clockwise through 20° from the same viewpoint. Each black dot represents a position voted as the object center 702. In the image data 800, a part in an orientation similar to the representative orientation in FIG. 8C exists at a position 802. For this reason, votes based on classification results on a plurality of local areas concentrate on a bin 803 corresponding to the position 802 on the voting plane in FIG. 8C. A vote result based on an erroneous classification result accidentally and sporadically exists like, for example, a bin 804 on a voting plane corresponding to an orientation which does not exist in the image. In this embodiment, since there are 10 local areas corresponding to each representative orientation, performing threshold processing for the values of the respective bins with, for example, a threshold of 5, can estimate that a part in a representative orientation corresponding to the voting plane exists at the position of the remaining bin. Obviously, it can be determined that the closer to 10, the higher the estimation reliability.

A procedure for position/orientation estimation processing in the tree type position/orientation estimation device according to this embodiment will be described next with reference to the flowchart of FIG. 9.

In step S901, the position/orientation estimation processing unit 108 performs initialization by clearing all the bins on the 4,680 voting planes corresponding to all the representative orientations to 0. The position/orientation estimation processing unit 108 also initializes the position of the extraction local rectangle to the upper left position in the image data 800 as indicated by the extraction local rectangle 801 in FIG. 8A (or the start position of the range in which the parts are known to exist).

In step S902, the position/orientation estimation processing unit 108 extracts an image at the position of the extraction local rectangle. The position/orientation estimation processing unit 108 then executes the processing of applying the extracted local rectangular image to the tree as follows. In step S903, the position/orientation estimation processing unit 108 selects the start node of the tree shown in FIG. 7B.

In step S904, the position/orientation estimation processing unit 108 reads feature discrimination parameters of dictionary information corresponding to the node selected in step S903, analyzes the features of the input rectangular image, and discriminates whether the node to be selected next is the right or left node on the tree.

In step S905, the position/orientation estimation processing unit 108 discriminates whether the next node is an end, that is, the next node has reached a leaf. That the next node has reached a leaf is equivalent to that the input local rectangular image is classified to one of the 46,800 local areas. If the position/orientation estimation processing unit 108 determines that the next node has reached a leaf (YES in step S905), the process advances to step S907. If the position/orientation estimation processing unit 108 determines that the next node has not reached a leaf (NO in step S905), the process advances to step S906.

In step S906, the position/orientation estimation processing unit 108 selects the next node. The process returns to step S904 to repeat similar processing. In step S907, the position/orientation estimation processing unit 108 reads the type of representative orientation to which the local area corresponding to the leaf belongs and relative position information at the voting destination.

In step S908, the position/orientation estimation processing unit 108 selects a voting plane corresponding to the representative orientation type. The position/orientation estimation processing unit 108 also selects a bin on the voltage plane which is to be voted, from the voting destination relative position, based on the current position of the extraction local rectangle, and increments the vote count.

In step S909, the position/orientation estimation processing unit 108 determines whether the position of the extraction rectangle has reached the end of the image (or the end of the range in which the parts are known to exist). If the position/orientation estimation processing unit 108 determines that the position of the extraction rectangle has reached the end (YES in step S909), the process advances to step S911. If the position/orientation estimation processing unit 108 determines that the position of the extraction rectangle has not reached the end of the image (NO in step S909), the process advances to step S910.

In step S910, the position/orientation estimation processing unit 108 moves the position of the extraction local rectangle to the next position. This scanning scheme is the same as that used to move the extraction window in the first embodiment described with reference to FIG. 4.

If the position/orientation estimation processing unit 108 has completed voting processing based on scanning to the end of the image and classification of each local rectangular image in step S909, the process shifts to the voting result checking processing which starts from step S911. In step S911, the position/orientation estimation processing unit 108 selects the first representative orientation.

In step S912, the position/orientation estimation processing unit 108 checks the value of each bin on the voting plane corresponding to the representative orientation selected in step S911, and performs the processing of leaving only a bin whose value is equal to or more than a threshold.

In step S913, the position/orientation estimation processing unit 108 calculates a corresponding position in the input image from the position of the remaining bin, and stores it in a position/orientation estimation result list, together with the selected representative orientation type.

In step S914, the position/orientation estimation processing unit 108 determines whether the processing is complete up to the last representative orientation. If the position/orientation estimation processing unit 108 determines that the processing is complete up to the last representative orientation (YES in step S914), the process advances to step S916. When the voting plane checking processing is complete up to the last representative orientation, the position/orientation estimation result list holds a list of the positions of the part in the respective representative orientations estimated to exist in the input image. If the position/orientation estimation processing unit 108 determines that the processing is not complete up to the last representative orientation (NO in step S914), the process advances to step S915.

In step S915, the position/orientation estimation processing unit 108 selects the next representative orientation. The process then returns to step S912 to repeat similar processing. In step S916, the position/orientation estimation processing unit 108 integrates these position/orientation data as in step S511. With the above operation, the processing is terminated.

As in the first embodiment, although not described in the flowchart for the sake of easy understanding, in practice, the apparatus simultaneously estimate the position of a part in the depth direction based on the size of the part or an output from a distance measuring sensor.

<Dictionary Deletion Processing in Case of Tree Type Classification>

Figure 6:
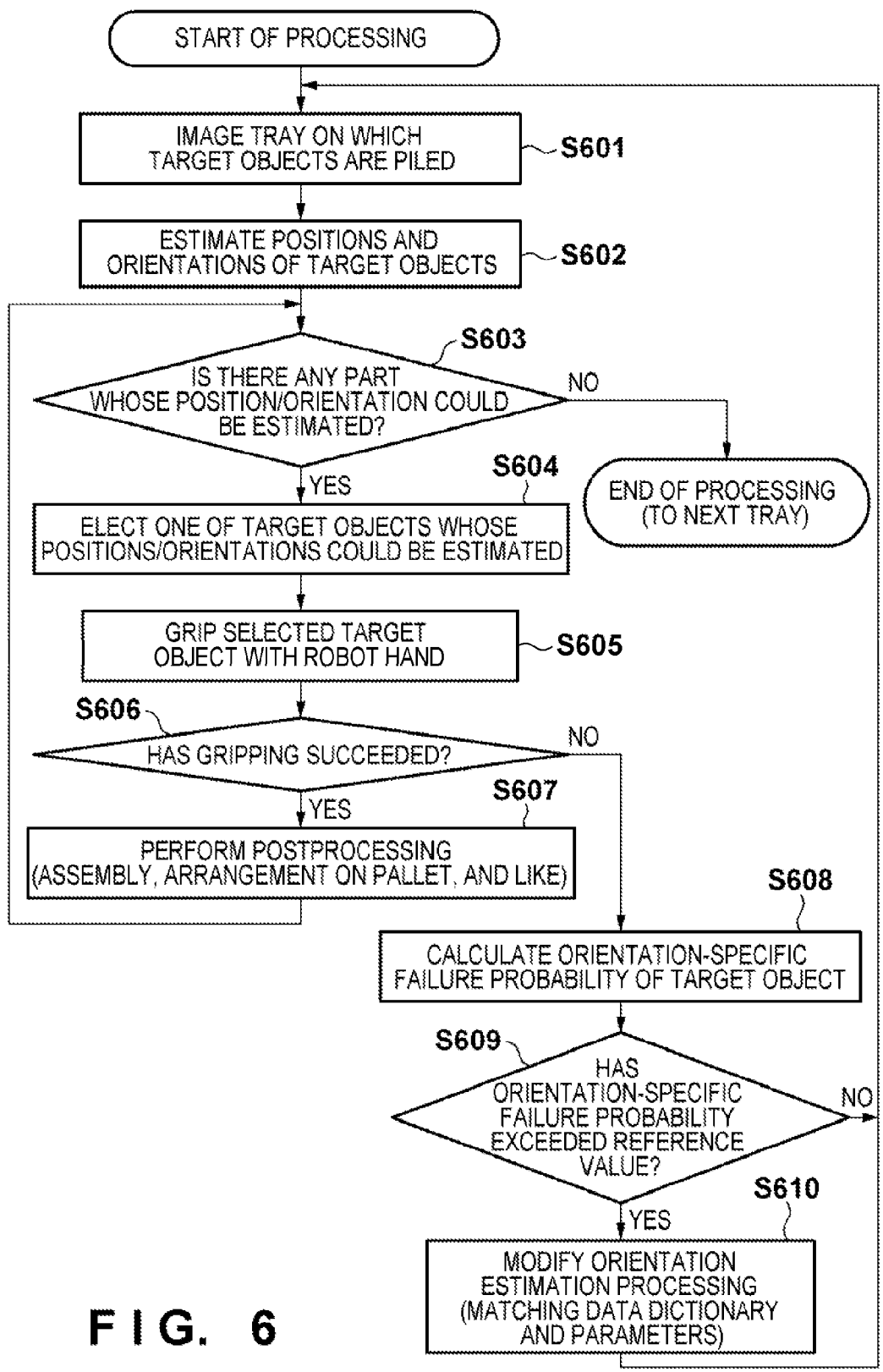
FIG. 6 is a flowchart showing a procedure for target object gripping processing.

This embodiment executes the processing of calculating an orientation-specific gripping failure probability in step S608 and the processing of discriminating whether a probability exceeds a reference value in step S609 in the flowchart of FIG. 6 in the same manner as in the first embodiment. Modification processing in estimation processing in step S610 is the processing of deleting nodes and leaves as described below.

Figure 10:
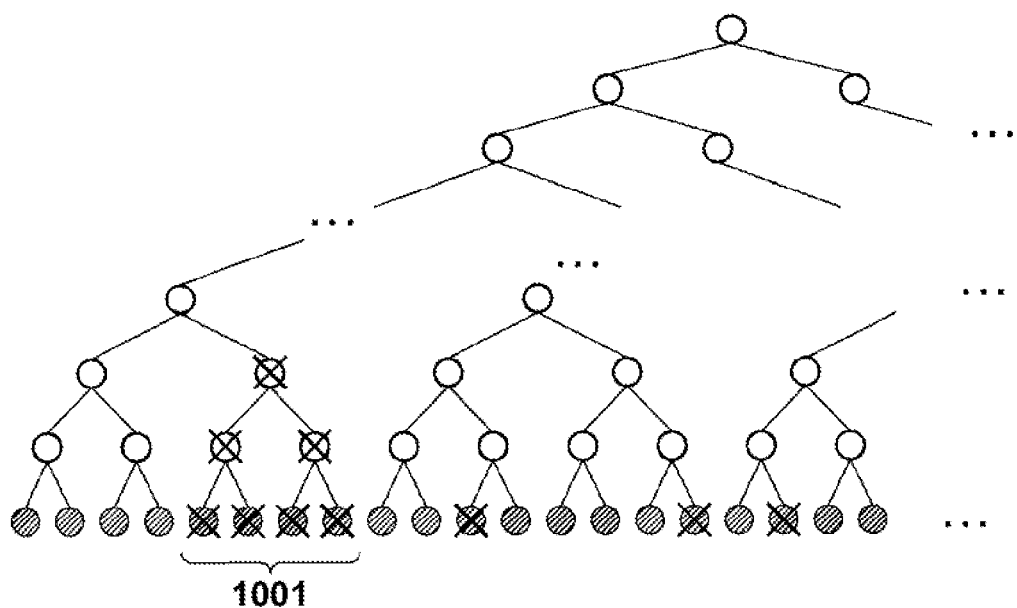
FIG. 10 is a view showing the manner of deleting matching data corresponding to a failure orientation in tree type orientation estimation processing.

FIG. 10 shows part of the tree type classifying device in FIG. 7B. In this case, each crossed leaf represents that the orientation-specific gripping failure probability of the representative orientation to which the local area class of the leaf belongs has become equal to or more than a predetermined value, and the corresponding dictionary information has been deleted.

When a given representative orientation is deleted, since there are 10 local area classes belonging to the orientation, dictionary information corresponding to 10 leaves is deleted. However, they do not always exist at adjacent positions on the tree. Therefore, as indicated by crossed leaves other than the leaves 1001 in FIG. 10, information is generally deleted at discontinuous positions.

As a result of deleting several representative orientations exhibiting high gripping failure probabilities, if partial continuous leaves like the leaves 1001 are deleted, it is possible to delete upper nodes having no branches.

When one leaf is deleted, information indicating a representative orientation type and information indicating a voting destination relative position are deleted. When one node is deleted, information for feature extraction and branch destination node information are deleted. This will gradually reduce the dictionary size and reduce the occupied memory capacity. As the occupied memory capacity decreases, the frequency of swapping or the like between the large-capacity memory and the high-speed memory decreases. This increases the possibility of speeding up estimation processing.

In step S904 in FIG. 9, if a node or leaf discriminated as a branch destination is deleted, the position/orientation estimation processing unit 108 may stop the processing for the rectangular image under processing. That is, the position/orientation estimation processing unit 108 may perform the processing in step S909 upon skipping the voting processing in steps S907 and S908. When the position/orientation estimation processing unit 108 stops the processing, the rectangular image is confirmed to be a part in an orientation which leads to a high failure probability. Therefore, the position/orientation estimation processing unit 108 can omit voting without posing any problem, and hence speeds up the estimation processing.

In addition, with regard to a deleted representative orientation, there is no need to perform orientation estimation, and hence there is no need to prepare a voting plane. This also makes it possible to reduce the memory occupation ratio.

With the progress of modification processing in estimation processing based on failure orientations, gripping failures themselves do not easily occur, and the overall procedure for gripping processing is gradually speeded up as in the first embodiment.

According to this embodiment, it is possible to speed up the processing of estimating the orientations of target objects and gripping them while reducing the failure probability of gripping operation for the target objects.

Third Embodiment

Modification by Changing Priority Order

The above embodiment has exemplified the case in which modification processing in estimation processing is performed by deleting matching data associated with representative orientations exhibiting high failure probabilities. However, modification processing in the present invention is not limited to this. For example, it is possible to perform, for example, modification so as to decrease the matching priority order of matching data associated with a representative orientation exhibiting a high failure probability. That is, the priority of matching of matching data associated with a representative orientation exhibiting a high failure probability is lowered. Modification by changing the priority order in this manner is effective when the number of scan positions of an extraction window is smaller than the number of orientation-specific templates in position/orientation estimation processing of the template matching type like that used in the first embodiment.

In this case, in the flowchart of FIG. 5, the order of the loop of scan processing (steps S501 to S509 and S510) and the loop of orientation-specific template selection (steps S503 to S507 and S508) is interchanged. In addition, in steps S503 and S508, templates are selected in the orientation-specific priority order. When the correlation value becomes equal to or more than the predetermined value in step S505 and a part in a representative orientation during selection is detected, the processing associated with the same position is stopped. The window then moves to the next scan position.

This will gradually lower the priority of matching which estimates a representative orientation exhibiting a high failure probability, and hence will decrease the gripping failure frequency. As a consequence, the efficiency of the procedure for gripping processing improves.

<Modification by Changing Weighting>

Alternatively, it is possible to set weighting coefficients corresponding to the respective representative orientations and modify the weighting coefficients based on an orientation-specific gripping failure probability. For example, referring to FIG. 5, the correlation value calculated in step S504 can be regarded as an orientation-specific score. Alternatively, referring to FIG. 9, the vote value of a bit remaining in the threshold processing in step S912 can also be regarded as an orientation-specific score.

In step S506 or S913, the apparatus sets, as a final orientation-specific reliability score, the value obtained by multiplying an orientation-specific score by a corresponding weighting coefficient, and stores the score in addition to the position/orientation (reliability calculation processing). Alternatively, in orientation estimation processing accompanying voting processing like that shown in FIG. 9, it is possible to increment the value of the bin selected by the voting processing in step S908 by a weighting coefficient instead of multiplying the value by the weighting coefficient. In this case, the value of the bin directly becomes a reliability score with consideration given to an orientation-specific weight.

The orientation-specific reliability scores stored in this case are referred to in the integration processing in step S511 or S916 to behave such that representative orientations with larger weighting coefficients tend to preferentially remain as integration results.

When using such representative-orientation-specific weighting coefficients, the apparatus performs modification processing in orientation estimation processing in step S610 in FIG. 6 in the following manner. First of all, let $W_\theta$ be a weighting coefficient for a representative orientation $\theta$. Assume that the initial value of $W_\theta$ at the startup of the system is given by $W_\theta = W_{\theta 0}$. The initial value $W_{\theta 0}$ may be common to all orientations or may be set in consideration of the ease of gripping or the tendency of assuming each orientation based on the known shape of each part. Let $P_\theta$ be an orientation-specific failure probability calculated in step S608. When an orientation hardly causes a failure, the failure probability $P_\theta$ comes close to 0. For this reason, in step S610, for example, the weighting coefficient $W_\theta$ is updated according to $W_\theta = (1 - P_\theta) W_{\theta 0}$. In this case, it is possible to omit step S609 and update the weighting coefficient $W_\theta$ every time detecting a failure without discriminating whether an orientation-specific failure probability exceeds a reference value.

Alternatively, it is possible to consider the influences of peripheral orientations near each orientation. For example, it is possible to modify $W_\theta$ by using the value calculated by performing discrete convolution computation for $P_\theta$ of each representative orientation by using the Gaussian kernel which decreases in accordance with the distance between viewpoints on a geodetic dome or an in-plane rotational angle.

Modifying weighting coefficients in this manner will also gradually make it difficult to detect orientations exhibiting high failure probabilities, thereby improving the efficiency of the procedure for gripping processing.

<Divided-Area-Specific Probability>

The above embodiment has exemplified the case in which the same position/orientation estimation processing is performed for the entire area of an input image. However, it is possible to divide an input image into areas and perform different types of position/orientation estimation processing for the respective areas.

Figure 11:
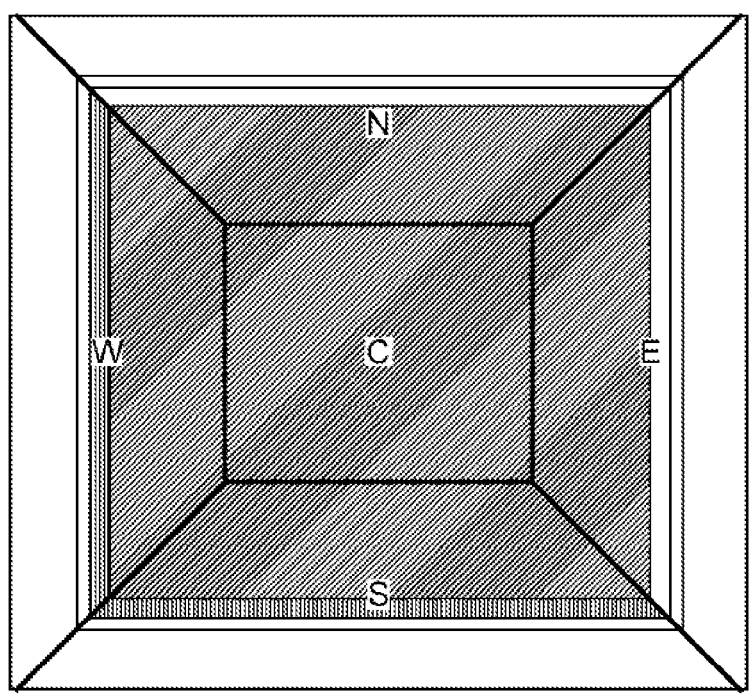
FIG. 11 is a view showing an example of dividing an area to be imaged by an imaging device.

FIG. 11 shows a case in which the target object gripping apparatus further includes an area dividing unit (not shown in FIG. 1) to divide the area of the image captured by an imaging device 103 into five areas C, N, S, E, and W. Note that the four areas N, S, E, and W, except for the central portion C, respectively correspond to north, south, east and west. The four areas each are close to any one of the wall surfaces of a tray 105. For this reason, when the apparatus grips the part, the gripping operation tends to be influenced by any one of the wall surfaces. It is therefore highly possible that the respective areas differ at least partially in representative orientation which tends to lead to a failure.

For this reason, when performing position/orientation estimation processing for the respective areas, the apparatus uses different dictionary data. Assume however that these five dictionary data are the same in the initial state. Assume also that the orientation-specific gripping failure probability calculated in step S608 in FIG. 6 is a divided-area-specific gripping failure probability. In step S610, the apparatus modifies dictionary data corresponding to each area.

Alternatively, when dividing an area, the apparatus may three-dimensionally divide the space in which a part can exist and modify dictionary data in the same manner as described above. This makes it possible to reduce the number of parts excluded as orientations exhibiting high failure probabilities while reducing the gripping failure probabilities, thereby gripping more parts on the tray.

<Consider Peripheral Orientations as Well>

The above embodiment has exemplified the case in which the apparatus performs modification for only a representative orientation subjected to a failure. However, it is also possible to simultaneously perform modification associated with peripheral orientations near the failure orientation. FIG. 12 shows an example of peripheral orientations. If a viewpoint 1201 is a viewpoint on a geodetic dome which defines the failure representative orientation, representative orientations defined by viewpoints 1202 to 1206 adjacent to the viewpoint 1201 are peripheral orientations. Alternatively, it is possible to use, as such viewpoints, other than adjacent viewpoints, viewpoints existing in a predetermined distance range on the geodetic dome centered on the viewpoint of a failure representative orientation. The same applies to in-plane rotation. That is, it is possible to set, as peripheral orientations, orientations within a predetermined range centered on the in-plane rotational angle of an orientation having undergone a gripping failure. It is also possible to decide the range of peripheral orientations based on the spatial distribution of failure probabilities.

The apparatus may perform modification processing in estimation processing so as to delete peripheral orientations altogether or change the degree of influence of modification based on a similarity to a failure orientation, for example, perform modification using the above weighting coefficients in accordance with the distance from the failure orientation. Alternatively, when calculating a failure probability, the apparatus can simultaneously increase the failure probabilities of peripheral orientations to some degree.

It is generally thought that peripheral orientations around an orientation which tends to lead to a gripping failure also exhibit high failure probabilities. Therefore, performing modification in consideration of such peripheral orientations can update the orientation estimation dictionary more efficiently.

<Notification of Gripping Failure by User>

The above embodiment has exemplified the case in which the apparatus detects a gripping failure probability based on an output from the force sensor (not shown) provided on the hand mechanism 102. However, the present invention is not limited to this. Obviously, for example, it is possible to accept a notification indicating that the user has recognized a gripping failure (notification acceptance processing).

Figure 13:
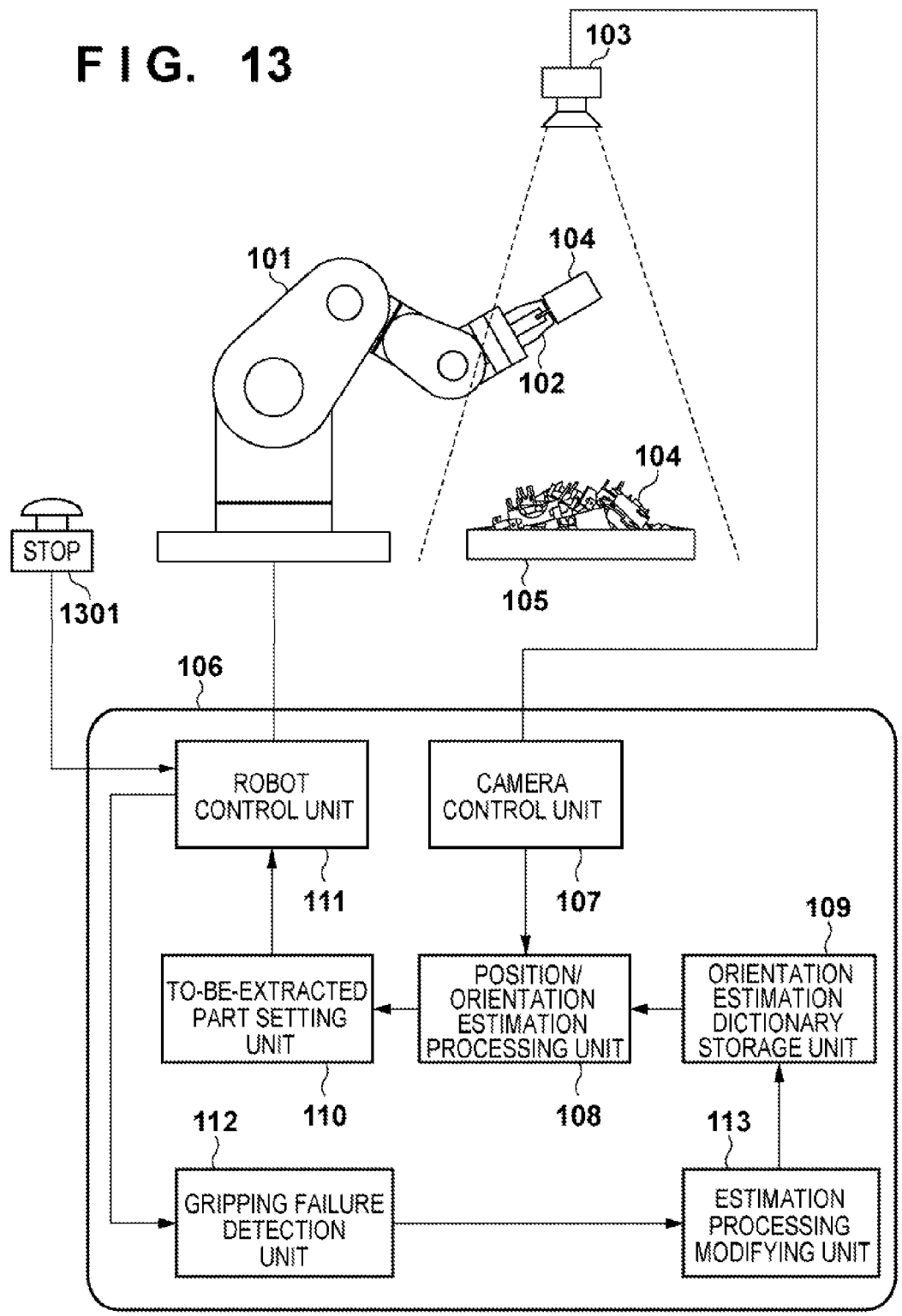
FIG. 13 is a view showing the arrangement of a target object gripping apparatus including a mechanism for allowing a user to notify the apparatus of a gripping failure.

For example, FIG. 13 shows a target object gripping apparatus having an emergency stop button 1301 connected to a robot control unit 111 on the assumption that the operator monitors the operation of the robot. When the robot fails to grip a part 104, the operator stops the robot by pressing the emergency stop button 1301. A gripping failure detection unit 112 can detect a gripping failure by recognizing an emergency stop via the robot control unit 111.

<For Only Orientation Estimation>

The above embodiment has exemplified the case in which the apparatus estimates both the position and orientation of a target object. However, the present invention can also be applied to a case in which the apparatus need not perform position estimation and performs only orientation estimation processing. FIG. 14 shows a case in which the positions of target objects are almost constant in every gripping operation.

A conveyor 1401 conveys parts 104 downward as target objects which can assume various orientations in FIG. 14. The parts 104 conveyed downward come into contact with a guide mechanism 1402 to be guided and further conveyed to a gripping position 1403 while their directions are adjusted to some extent. When one part 104 comes to the gripping position 1403, a light-shielded sensor (not shown) or the like detects this. The conveyor 1401 temporarily stops.

The apparatus then performs orientation estimation processing for the part 104 at the gripping position 1403. As this processing, the apparatus can basically use processing almost similar to the position/orientation estimation processing in the above embodiment. However, since the position at which the part exists is almost determined, it is possible to perform orientation estimation processing associated with only one portion or by only scanning within a very limited range. In addition, since the guide mechanism 1402 has adjusted the orientation of the part to some extent, it is possible to use an orientation estimation dictionary with a smaller amount of representative orientation matching data from the beginning.

A robot arm 101 and a hand mechanism 102 perform gripping processing based on the orientation estimation result. When detecting a gripping failure, the apparatus modifies the estimation processing in the same manner as in the above embodiment. Upon completion of gripping operation and postprocessing, the apparatus resumes conveying the part 104 using the conveyor 1401. Subsequently, the apparatus repeats the above processing.

When the apparatus fails to grip a part or does not estimate an orientation because the failure probability of the orientation is high, the conveyor 1401 conveys the part at the gripping position 1403 downward in FIG. 14 to throw it into a recycling box 1404. The operator or the like places the part thrown into the recycling box 1404 on the conveyor 1401 again.

The above embodiment have been described on the assumption that target objects are of a single type. Obviously, however, the embodiments can cope with a plurality of types of target objects. In this case, the apparatus may hold matching data corresponding to representative orientations for each of a plurality of target objects and may simultaneously use them.

Although the preferred embodiments of the present invention have been described in detail, the present invention is not limited to any specific embodiments and can be variously modified and changed within the scope of the present invention described in the accompanying claims. It is needless to say that the present invention can be applied to, for example, various types of robot systems such as domestic robots as well as industrial robots.

According to this embodiment, it is possible to speed up the processing of estimating the orientation of a target object and gripping it while reducing the gripping failure probability of gripping operation for target objects.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-143389 filed on Jun. 28, 2011, which is hereby incorporated by reference herein in its entirety.

What is claimed is:

1. A target object holding apparatus comprising:
   an image obtaining unit configured to obtain an image including a target object;
   a storing unit configured to store a dictionary for estimating an orientation of the target object;
   an estimation unit configured to estimate an orientation of the target object included in the image by referring to the dictionary;
   a controlling unit configured to cause a holding unit to hold the target object based on the orientation of the target object estimated by said estimation unit;
   a detection unit configured to detect a failure of holding by said holding unit; and
   a modifying unit configured to modify the dictionary based on the orientation of the target object when said detection unit detects a holding failure.

2. The apparatus according to claim 1, further comprising a calculation unit configured to calculate an orientation-specific holding failure probability based on the orientation of the target object when said detection unit detects a holding failure,
   wherein said modifying unit modifies the dictionary based on the orientation-specific holding failure probability.

3. The apparatus according to claim 2, further comprising an area dividing unit configured to divide an area where the target object can exist into a plurality of areas,
   wherein said calculation unit calculates an orientation-specific holding failure probability for each area divided by said area dividing unit based on a position and orientation of the target object when said detection unit detects a holding failure, and
   said modifying unit modifies dictionary for each area based on an orientation-specific holding failure probability for each of the divided areas.

4. The apparatus according to claim 1, wherein the dictionary comprises each matching data corresponding to each orientation of the target object.

5. The apparatus according to claim 4, wherein
   said modifying unit invalidates matching data corresponding to an orientation exhibiting the orientation-specific holding failure probability not less than a threshold.

6. The apparatus according to claim 4, wherein said modifying unit deletes, from the dictionary, matching data corresponding to an orientation of the target object when said detection unit detects a holding failure.

7. The apparatus according to claim 4, wherein the dictionary includes a matching priority order indicating a matching order of matching data corresponding to each orientation of the target object, and
   said modifying unit modifies the matching priority order so as to make a priority of matching of matching data corresponding to an orientation of the target object when said detection unit detects a holding failure lower than a priority of matching of a target object using matching data for other orientations.

8. The apparatus according to claim 4, wherein said estimation unit comprises a correlation value calculation unit configured to calculate a correlation value between an orientation of the target object and the matching data for each orientation, and
said estimation unit estimates an orientation of the target object based on the correlation value.

9. The apparatus according to claim 8, wherein the dictionary includes a predetermined weighting coefficient corresponding to each orientation of the target object,
said estimation unit comprises a reliability calculation unit configured to calculate an orientation-specific reliability by multiplying the correlation value by the predetermined weighting coefficient corresponding to each orientation,
said estimation unit estimates an orientation of the target object based on the reliability, and
said modifying unit modifies the weighting coefficient corresponding to the orientation of the target object when said detection unit detects a holding failure to a lower value.

10. The apparatus according to claim 4, wherein said modifying unit modifies not only the matching data corresponding to an orientation of the target object when said detection unit detects a holding failure but also the matching data corresponding to a peripheral orientation within a predetermined range relative to the orientation.

11. The apparatus according to claim 1, wherein said detection unit detects a holding failure based on an output from a sensor provided for said holding unit.

12. The apparatus according to claim 1, further comprising an acceptance unit configured to accept a notification of a failure of holding the target object which is recognized by a user,
wherein said detection unit detects a holding failure based on the notification.

13. The apparatus according to claim 1, wherein said estimation unit estimates an orientation of the target object based on an image captured by an imaging unit.

14. The apparatus according to claim 1, wherein said estimation unit estimates an orientation of the target object based on distance information acquired from a distance measuring sensor.

15. A method for controlling a target object holding apparatus, the method comprising the steps of:
obtaining an image including a target object;
storing a dictionary for estimating an orientation of the target object;
estimating an orientation of the target object included in the image by referring to the dictionary;
holding the target object based on the orientation of the target object estimated in the estimating step;
detecting a holding failure in the holding step; and
modifying the dictionary based on the orientation of the target object when a holding failure is detected in the detecting step.

16. A non-transitory computer-readable storage medium storing a computer program for causing a computer to execute each step in a method for controlling a target object holding apparatus defined in claim 15.

17. The apparatus according to claim 1, wherein said estimation unit estimates the orientation of the target object included in the image by comparing each data with the image.

18. The apparatus according to claim 1, wherein the dictionary is generated by classifying each image of each orientation of the target object based on a feature amount of each image.

19. The apparatus according to claim 18, wherein the dictionary is formed in a tree structure.

20. The apparatus according to claim 18, further comprising
an extracting unit configured to extract a feature amount from the obtained image,
wherein the estimation unit estimates the orientation of the target object included in the image by classifying the obtained image based on the extracted feature amount and the dictionary.

* * * * *